United States Patent [19]

Rahm et al.

[11] 4,252,366
[45] Feb. 24, 1981

[54] MOVABLE ROOF PANEL STRUCTURE

[75] Inventors: James D. Rahm, Ocean City, N.J.; George Purcell, Southgate; Michael P. Alexander, Grosse Isle, both of Mich.

[73] Assignee: American Sunroof Corporation, Southgate, Mich.

[21] Appl. No.: 79,510

[22] Filed: Sep. 27, 1979

[51] Int. Cl.³ .............................................. B60J 7/02
[52] U.S. Cl. ................................................... 296/222
[58] Field of Search ............... 290/216, 222, 223, 224; 49/213, 449

[56] References Cited

U.S. PATENT DOCUMENTS

| | | | |
|---|---|---|---|
| 2,968,514 | 1/1961 | Golde | 296/222 |
| 3,044,825 | 7/1962 | Golde | 296/216 |
| 3,863,979 | 2/1975 | Bienert | 296/222 |
| 4,178,036 | 12/1979 | Kalitz | 296/222 |

Primary Examiner—Robert R. Song
Attorney, Agent, or Firm—Basile, Weintraub & Hanlon

[57] ABSTRACT

A movable roof panel for vehicles having an opening in the roof is slidable between open and closed positions. A pair of longitudinally extending guide rails having recessed, horizontally disposed guide tracks therein, are connected to a frame assembly surrounding the edges of the roof opening. The guide tracks define a forward, vertically inclined portion and a rearward, substantially horizontal position. Front and rear guide pins extending from brackets connected to the longitudinal edges of the movable roof panel slidably engage the guide tracks to control the movement of the movable roof panel between open, closed and intermediate positions. Alternately, a stationary roof panel is disposed in the roof opening with the movable roof panel. A cross beam separates the stationary and movable roof panels and provides sealing for the movable roof panel when it is in the closed position and, also, cooperates with a latch which is preferably mounted on the rear portion of the movable panel to releasably secure the movable panel in the closed position.

10 Claims, 5 Drawing Figures

MOVABLE ROOF PANEL STRUCTURE

BACKGROUND OF THE INVENTION

1. Field of the Invention

This invention, relates, in general, to vehicle roof structures and, more specifically, to vehicle roof structures incorporating a sliding roof panel for selectively opening and closing an opening in the vehicle roof.

2. Description of the Prior Art

In todays automobile market, a popular vehicle option is the so-called "sun" or "moon" roof in which a movable panel is retractable between closed and open positions in an opening formed in the vehicle roof. The movable roof panels are typically formed of a transparent material, such as glass or plastic, to allow light to enter the interior of the vehicle when the panel is in the closed position.

Such movable roof panels are conventionally moved along a track assembly extending longitudinally along each side of the roof opening and mounted between the edges of the roof opening. The entire track assembly is usually inclined so that the movable roof panel is stored or nested beneath the rear stationary roof panel when the movable panel is in the open position. The movable panel rises vertically as it is moved forward to the closed position so that, when in the closed position, the movable roof panel is flush with the adjacent roof structure. A compressible seal member is provided on either the roof structure or the closure panel which is compressed between the penels as the movable panel reaches its closed position.

A disadvantage of the prior art movable roof panel structures is that a relatively complex guide track mechanism is necessary to move the panel between the open and closed positions. This not only increases the expense of the movable roof structure and the vehicle weight, but also, complicates installation of the movable roof panel assembly onto the vehicle. Further, the length of conventional movable roof panels in conjunction with the inclined surface of the guide track assembly requires additional space within the interior of the vehicle to store the roof panel in the open position. This reduces the available headroom within the vehicle and makes the movable roof panel structure less desirable. Finally, it is common for operators of vehicles to leave the movable roof panel somewhere inbetween the fully opened and fully closed positions, either to reduce the incoming flow of air or due to external weather conditions. It becomes necessary to securely hold the panel in the desired partially opened position.

Therefore, it is desirable to provide a movable roof panel structure for vehicle roofs which utilize a more simplified guide track mechanism for guiding the movable panel between open and closed positions than previous prior art roof structures. Also, it is desirable to provide a movable roof panel structure which requires less space within the interior of the vehicle for storing the movable panel in the open position. Finally, it is desirable to provide a movable roof panel structure which may be securely disposed in a plurality of partially opened positions.

SUMMARY OF THE INVENTION

There is disclosed herein a new and improved movable roof panel structure for vehicles having an opening in the roof thereof. The movable roof panel structure includes a frame assembly which is secured around the edges of the roof opening. A pair of longitudinally extending guide rails are disposed within the longitudinal sides of the frame assembly. The guide rails each include a recessed guide track defining a forward, vertically inclining portion and a rearward substantially horizontal portion. Front and rear guide pins extending from brackets connected to the longitudinal sides of the movable roof panel slidably engage the guide tracks in the guide rails to control the movement of the roof panel between open, closed and intermediate positions.

In operation, when the roof panel is moved or being urged forward from an open to a closed position, the front guide pins ride up the forward, inclined portion of the guide track until the forward edge of the roof panel engages a seal member mounted on the periphery of the frame assembly. Simultaneously, the rear guide pins are disposed in alignment with an upward extending slot in the guide track which allows the rear of the movable roof panel to be manually raised until the movable roof panel engages the peripheral seal around the frame assembly. The movable roof panel is then latched in the closed position.

In moving the roof panel to an open position, the roof panel is unlatched and the rear portion thereof manually lowered until the rear guide pins engage the horizontal portion of the guide track. The movable roof panel is then urged rearward such that the front guide pins ride down the inclined portion of the guide track and along the horizontal portion thereof. Rearward movement of the movable panel may be continued until the rear guide pins engage a second rearmost slot or recess in the guide track which securely holds the movable roof panel in the completely open position. An additional number of spaced second slots or recesses may be provided in the horizontal portion of the guide track so that the movable roof panel may be securely left in any one of a selected number of partially open positions.

Alternately, a second roof panel may be stationarily disposed in the roof opening with the movable panel. A cross beam spans the peripheral frame and separates the movable and stationary roof panels when the movable panel is in the closed position. The cross beam provides sealing across a lateral edge of the movable panel and, also cooperates with the latch preferredly mounted on the rear portion of the movable panel to releasably latch the movable panel in the closed position.

The movable roof panel structure of this invention overcomes many of the shortcomings encountered in the use of prior art roof panel structures. More specifically, the movable roof panel structure of this invention utilizes a more simplified guide track mechansim than similiar prior art movable roof panel structures. This not only reduces the expense of the movable roof panel structure, but also simplifies the installation to such an extent that the entire movable roof panel structure, including the peripheral frame and seal, may be subassembled into a complete module before its installation on the vehicle. In addition, the guide track is disposed substantially horizontally in line with the roof of the vehicle which requires less interior space within the vehicle to store the movable panel in the open position and thereby increases the interior headroom. Finally, the unique guide track mechanism of this invention enables the movable roof panel to be securely left in any one of a selected number of partially opened positions; which feature has heretofore not been effectively provided in prior art movable roof panel structures.

BRIEF DESCRIPTION OF THE DRAWING

The various features, advantages and other uses of this invention will become more apparent by referring to the following detailed description and drawing in which.

DESCRIPTION OF THE PREFERRED EMBODIMENT

Figure 1:
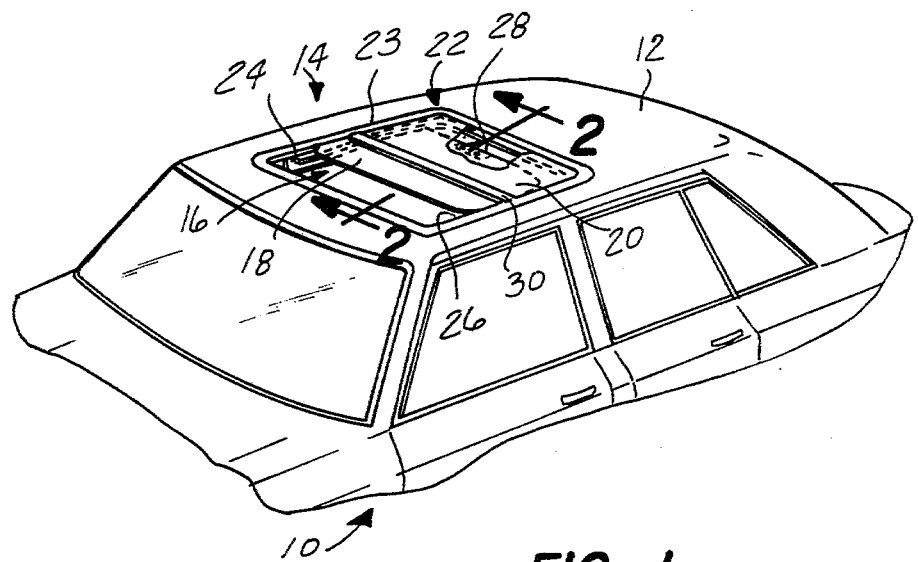
FIG. 1 is a partial perspective view of a vehicle employing a movable roof panel structure constructed according to the teachings of this invention.

Throughout the following description, identical reference numbers are used to refer to the same component shown in multiple figures of the drawing.

Referring now to the drawing, and to FIG. 1 in particular, there is shown a portion of a motor vehicle 10 having a roof 12 and employing a movable roof panel structure, shown generally at reference number 14, constructed according to the teachings of this invention. The movable roof panel structure 14 is disposed within a roof opening 16 which extends substantially across the entire width of the roof 12 of the vehicle 10. The opening 16 is preferably located near the front portion of the roof 12 so as to be located over the front seat of the vehicle 10, although the movable panel may be situated elsewhere on the roof 12. The opening 16 is formed by cutting a substantially rectangular opening in the front portion of the roof 12 such that the opening 16 is surrounded on all four sides by a stationary portion of the roof 12.

In general, the movable roof panel structure 14 comprises a movable roof panel 18 which is retractable between closed and opened positions, a stationary panel 20 which is preferrably located rearward of the movable roof panel when the movable roof panel 18 is in the closed position and a suitable frame assembly 22 which surrounds the movable and stationary roof panels 18 and 20, respectively, and provides a suitable mounting surface therefore.

It will be understood that, although separate movable and stationary roof panels are illustrated and described hereafter, the teachings of this invention are equally applicable to those roof structures incorporating a single movable roof panel which is stored beneath the adjacent structure of the roof 12 of the vehicle 10. Furthermore, the teachings of this invention apply to roof structures in which the stationary panel has different dimensions than the movable panels, to roof structures in which the stationary panel is disposed forward of the movable panel and to roof structures having two spaced, individual movable panel assemblies.

As shown in FIG. 1, the movable roof panel structure of this invention includes a frame assembly 22 having a peripheral flange portion 23 which is mounted around the edges of the opening 16 in the roof 12 of the vehicle 10. The peripheral portion 23 comprises a substantially channel-like configuration with a top flange portion which covers the frame assembly and provides an aesthetic appearance for the movable roof panel structure when the movable roof panel structure 14 is mounted in the roof 12 of the vehicle 10. A pair of guide rail assemblies 24 and 26 are disposed within the longitudinal sides of the frame assembly 22 and secured thereto. The guide rails 24 and 26 each include a rescessed guide track which cooperates with the movable roof panel 18 to control the movement of the roof panel 18 between closed and open positions.

The movable roof panel 18 of the movable roof panel structure 14 has a substantially rectangular configuration. Furthermore, the movable roof panel 18 is preferrably formed of a transparent material, such as glass or plastic. Alternately, the roof panel 18 can be formed of an opaque material, such as metal or fiberglass or the like, or it can be formed of a translucent glass or plastic.

A conventional latch mechanism 28 is mounted on the rear edge of the movable roof panel 18 and cooperates with a lip formed on a cross bar 30 of the frame assembly 22 to detachably latch the movable roof panel 18 in the closed position. Although the latch mechanism 28 is described and illustrated with the latch located on the rear of the movable panel 18, it will be understood that the latch mechanism may also be located on the front or side edges of the movable panel.

The movable roof panel structure 14 also includes a stationary roof panel 20 which is preferably formed of the same material as the movable roof panel 18 and is secured between the cross beam 30 and the frame assembly 22.

Referring now to FIGS. 2, 3, 4 and 5, there is shown detailed drawings of the movable roof panel structure 14 constructed according to the teachings of this invention. As shown most clearly in FIG. 2, the front portion of the peripheral portion 23 of the frame assembly 22 comprises a channel-like portion 34 and a top flange portion 36 which are disposed within the peripheral edges of the opening 16 in the roof 12 of the vehicle 10. The top flange 36 covers the edges of the roof opening 16 and provides an aesthetic appearance to the movable roof panel structure 14 of this invention. A suitable seal 38, formed of a resilient material, such as rubber is disposed within the channel portion 34 of the frame assembly 22 so as to provide a fluid tight seal with the movable roof panel 18 when the movable roof panel 18 is in the closed position. The channel portion 34 of the frame assembly 22 further functions to provide a nesting place for the forward edge of the movable roof panel 18 when the movable roof panel 18 is in the closed position. In addition, an angle member 40 is disposed beneath the portions 34 and 36 of the channel assembly 22 and connected thereto, such as at reference number 42, by suitable fasterners not shown. The angle member 40 serves to provide a mounting place between the frame anssembly 22 and the adjacent stationary roof structure 12 of the vehicle 10 and further, provides a suitable mounting place for the interior headliner and trim molding components, not shown, which are normally mounted along the exterior edges of the movable roof panel structure 14.

The frame structure 22 also includes a laterally extending cross beam 30 which is joined to the longitudinal sides of the frame assembly 22 at each end thereof. The cross beam 30 is formed with a top flange portion 44 which provides an exterior molding for the movable roof panel structure 14. The cross beam 30 further includes a rearward extending channel portion 46, wherein is mounted a suitable seal member 48 for providing and sealingly securing thereto the forward portion of the stationary roof panel 20. The downward extending flange portion 50 of the cross beam 30 includes a lip 52 which cooperates with the latch mechanism 28 connected to the rear edge of the movable roof panel 18 to detachably latch the movable roof panel 18 in the closed position, as described in greated detail hereafter.

The rearmost portion of the peripheral frame 23 is formed with first and second channel portions 54 and 56, respectively. Suitable seal members 58 and 60 are disposed within the first and second channel portions 54 and 56, respectively, to securely and sealingly hold the rear edge of the stationary roof panel 20 when the movable roof panel 18 is in the full open position.

Figure 4:
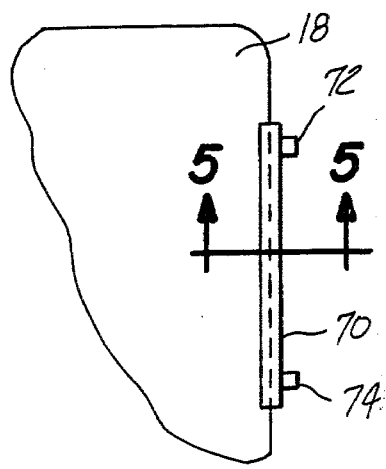
FIG. 4 is a partial plan view of the movable roof panel of this invention.
Figure 5:
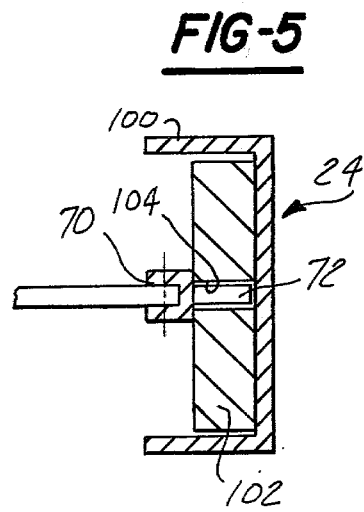
FIG. 5 is a cross sectional view, generally taken along line 5—5 in FIG. 4 and including portions of the guide rail assembly, showing the engagement between the movable roof panel and the guide rail mechanism.
Figure 2:
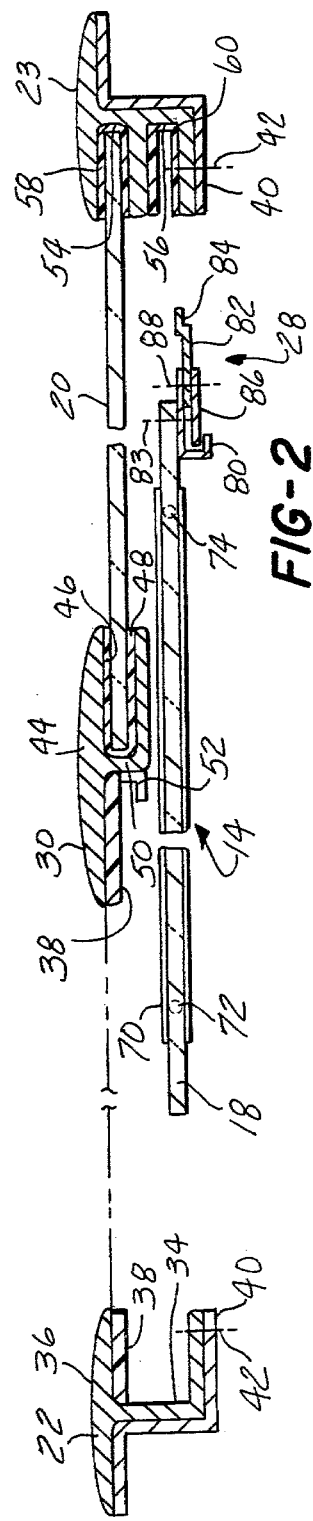
FIG. 2 is a cross sectional view, generally taken along the line 2—2 in FIG. 1, of the movable roof panel structure of this invention.

As shown in FIGS. 2, 4 and 5, a pair of longitudinally extending channel members 70 are connected to the longitudinally extending edges of the movable roof panel 18. A pair of front and rear guide pins 72 and 74, respectively, are mounted in each channel member 70 so as to extend laterally outward therefrom. The guide pins 72 and 74 slidably engage the guide tracks in the guide rail assembly, as described hereafter, to control the movement of the movable roof panel between open, closed and intermediate positions.

Referring again to FIG. 2, there is shown a latch mechanism 28 which is secured to the rear portion of the movable roof panel 18, at reference number 83, by suitable fasteners, not shown. The latch mechanism 28 serves to detachably latch the movable roof panel 18 in the closed position thereby maintaining the movable roof panel in sealed engagement with the seal and adjoining frame 23 and, further, enables the movable roof panel 18 to be released therefrom to permit its movement to the open position.

The latch mechanism 28 comprises an angle bracket 80 which is mounted to the rear portion of the movable roof panel 18 by suitable fasteners at reference number 83. A latch member 82 is pivotally mounted to the angle bracket 80. The latch member 82 includes an upstanding lip portion 84 which is adapted to engage the downward extending lip 52 or the cross beam 30 to thereby enable the movable roof panel 18 to be detachably latched in the closed position. A handle 86 is securely connected to the latch member 82 to enable the operator of the vehicle to pivotally rotate the latch member 82 about the pivot point 88 to thereby engage or disengage the rear portion of the movable roof panel 18 from the lip 52 on the cross beam 30.

Figure 3:
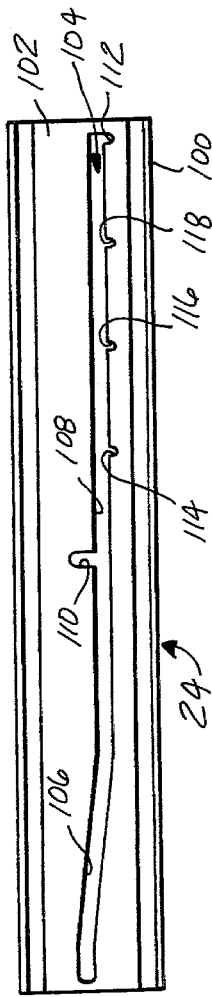
FIG. 3 is a plan view of one of the guide rail mechanisms of this invention.

Referring now to FIGS. 3 and 5, there is shown a detailed illustration of one of the guide rail assemblies utilized to control the movement of the movable roof panel 18 between open, closed intermediate positions. Each guide rail assembly, such as guide rail assembly 24, comprises a substantially U-shaped channel member 100 which is secured by suitable means, not shown, to the depending peripheral flange portion 23 of the frame assembly 22 surrounding the periphery of the opening 16 in the roof 12. The guide rail assembly 24 extends substantially longitudinally along the longitudinal sides of the roof opening 16.

Since both guide rail assemblies 24 and 26 are constructed in identical, mirror-image fashion, only one of the guide rail assemblies, such as guide rail assembly 24, will be depicted and described in greater detail hereafter.

The guide rail assembly 24 further includes a longitudinally extending guide track 102 which is affixed to the channel member 100. The guide track 102 includes a substantially longitudinally extending, recessed track portion, shown generally at reference number 104. The recessed track 104 is formed to define a forward, vertically inclining portion 106 and a rearward, substantially horizontally extending portion 108. Furthermore, the track portion 104 includes a first, upward extending slot 110 located such that when the movable roof panel 18 is in the forward position, with the front guide pin 72 completely forward on the vertically inclined portion 106 of the track 104, the rear guide pin 74 will be substantially in alignment with the first slot 110 to permit the movable roof panel 18 to be manually raised at which time the rear guide pin 74 slidably engages the slot 110. The recessed track 104 also includes a second, downward extending recess or slot 112 located at the rearmost end of the recessed track 104. The second recess 112 serves to securely hold the rear guide pin 74 in position when the movable roof panel 18 is urged to the completely open position.

The recessed track 104 also includes a plurality of second recesses or slots 114, 116 and 118 which are spaced along the horizontal portion 108 of the recessed track 104. Although recess is defined and illustrated as being in the form of a slot, it should be noted that the term "recess" also includes any suitably formed groove, depressions or serrations operable to engage the guide pins. The recesses 114, 116, and 118, provide a secure position for the rear guide pin affixed to the longitudinal edge of the movable roof panel 18 such that the movable roof panel 18 may be securely disposed in a selected one of the recesses 114, 116, and 118 so as to dispose the movable roof panel 18 in any one of a plurality of partially open positions.

The operation of movable roof panel assembly of this invention will now be described in conjunction with FIGS. 2 and 3. When the movable roof panel 18 is in the full open position, the movable roof panel 18 will be disposed fully rearward beneath the stationary panel 20, with the rear edge thereof nesting in the second channel 56 in the rearmost portion 23 of the frame assembly 22. The movable roof panel 18 may be moved to the closed position by urging the movable roof panel 18 forward, such as by grasping the angle bracket 80 of the latch mechanism 28 and pushing the movable roof panel 18 towards the front of the vehicle 10.

As the movable roof panel 18 is urged forward, the guide pins 72 and 74 slide along the recessed tracks 104 in the guide tracks 102. The front guide pins 72 slide up the forward, inclined portion 106 of the recessed guide tracks 104 until they abutt the forward end of the recessed tracks 104. At the same time, the rear guide pins 74 affixed to the movable roof panel 18 will be in substantial alignment with the first slot 110 in the guide tracks 102. In this manner, the rearmost portion of the movable panel 18 may be manually urged upward in a vertical direction such that the rear guide pins 74 slide vertically up the first slots 110 until the rearmost edge of the movable roof panel 18 engages the seal 38 affixed to the cross beam 30. The latch member 82 may then be pivotally rotated, such as by rotating the handle 86, until the upstanding lip 84 on the latch member 82 engages the corresponding lip 52 affixed to the cross beam 30 at which time the movable roof panel 18 is securely affixed in the closed position.

An identical, although reverse sequence of operation is utilized to slide the movable roof panel 18 from the closed to the open position. Initially, the latch member 82 of the latch mechanism 28 is rotated until the upstanding lip 84 or the latch member 82 disengages from the lip 52 on the cross beam 30. The movable roof panel 18 is then manually lowered until the rear guide pins 74 rest on the substantially horizontal portion 108 of the guide tracks 104. The movable roof panel 18 is then urged rearward urged rearward such that the front guide pins 72 ride down the inclined portion 106 of the recessed tracks 104. If it is desired to fully open the roof opening 16, the movable roof panel 18 is continually urged rearward until the rear guide pins 74 engage the rearmost recess 112 in the tracks 104 of the guide track assemblies 102. The rear guide pins 74 thus engage the recess 112 thereby securely holding the movable roof panel 18 in the completely open position wherein the movable roof panel 18 is stored beneath the stationary roof panel 20.

Alternately, the rear guide pins 74 may be disposed in registry with a selected one of the intermediate recesses, 114,116 and 118 in the guide tracks 102 to enable the movable roof panel 18 to be disposed in a selected one of several partially opened positions. When the rear guide pins 74 engage one of the recesses 114, 116, 118, the movable roof panel 18 is securely maintained in the desired partially opened position.

In summary, there has been disclosed herein a movable roof panel for vehicles having an opening in the roof which is movable between open and closed positions. The roof panel structure includes a pair of longitudinally extending, substantially horizontally extending guide rails disposed in a peripheral frame surrounding the edges of the roof opening. The guide rails include a guide track which defines a forward, vertically inclined portion and a rearward, substantially horizontal portion. Front and rear guide pins extending from brackets connected to the longitudinal edges fo the movable roof panel slidably engage the guide tracks to control the movement of the movable roof panel between open, closed and intermediate positions. When the movable roof panel is urged forward to the closed position, the front guide pins slide up the inclined portion of the guide track until the forward portion of the movable roof panel sealingly engages a seal member disposed in the peripheral frame assembly. At the same time, the rear guide pins are in substantial alignment with an upstanding slot in the guide track to enable the rear portion of the movable roof panel to be manually raised and latched in the closed position.

When the movable roof panel is moved from the closed to the open position, the guide pins slide along the guide tracks until the rear guide pins engage a rearmost recess in the guide tracks thereby securely maintaining the movable roof panel in the full open position. Alternately, the rear guide pins may be left in one of a plurality of additional spaced recesses in the guide tracks thereby enabling the movable roof panel to be disposed in a selected one of a plurality of partially open positions.

What is claimed is:

1. A movable roof panel structure of a vehicle having an opening in the roof comprising:
   a movable roof panel slidable between open and closed positions;
   a frame assembly bounding the peripheral edges of said roof opening; and
   first and second longitudinally extending guide rails mounted on said frame assembly;
   each of said first and second guide rails including a longitudinally extending, guide track having a forward, vertically inclined portion and a rearward, substantially horizontally extending portion;
   first and second, spaced, laterally extending guide pins mounted on each longitudinal side of said movable roof panel and slidably engaging said guide tracks in said first and second guide rails;
   each of said guide tracks having an upward extending first recess which is engaged by said rear guide pin when said movable roof panel is in the closed position to permit said movable roof panel to be raised into engagement with said frame assembly;
   each of said guide tracks also having a second spaced recess which is engaged by said rear guide pin when said movable roof panel is in the open position to securely hold said movable roof panel in said open position.

2. The movable roof panel structure of claim 1 further including means for releasably latching the movable roof panel to the adjacent roof structure when said movable roof panel is in the closed position.

3. The movable roof panel structure of claim 2 wherein the latch means is carried on the rear portion of the movable roof panel.

4. The movable roof panel structure of claim 1 wherein the guide tracks in the first and second guide rails include a third, intermediately spaced recess, the second guide pins selectively engaging any one of the second or third recesses so as to securely hold the movable roof panel in a selected one of a partially or fully opened position.

5. The movable roof panel structure of claim 1 wherein the guide tracks are disposed substantially horizontally below the adjacent roof structure such that the movable roof panel is stored beneath the adjacent roof structure when said movable roof panel is in the completely open position.

6. The movable roof panel structure of claim 1 further including seal means disposed around the edges of the frame assembly for sealingly engaging the movable roof panel when said movable panel is in the closed position.

7. The movable roof panel structure of claim 1 further including:
   a stationary roof panel disposed in the roof opening with the movable roof panel;
   a cross beam disposed between said stationary and said movable roof panels, said cross beam holding said stationary panel in sealed relationship and adapted to sealingly hold the lateral edge of said movable panel in sealed relationship when said movable roof is in the closed position.

8. The movable roof panel structure of claim 7 wherein the stationary roof panel is disposed rearward of the movable roof panel.

9. The movable roof panel structure of claim 7 wherein the movable roof panel includes means mounted on the rear portion thereof for releasably latching said movable roof panel in the closed position; and
   the cross beam includes a depending flange portion;
   said latching means releasably engaging said depending flange portion on said cross beam when said movable roof panel is in the closed position so as to maintain said movable roof panel in the closed position and allow its release to an open position.

10. The movable roof panel structure of claim 1 wherein the guide rails each comprise:
a longitudinally extending channel member affixed to the peripheral edges of the roof opening;
the guide track being affixed to said channel member and having a recessed track formed therein defining the forward, vertically inclined portion and the rearward, substantially horizontally extending portion.

* * * * *